United States Patent
Kim et al.

(10) Patent No.: US 10,776,580 B2
(45) Date of Patent: Sep. 15, 2020

(54) METHOD FOR PROVIDING DIALOGUE SERVICE WITH CHATBOT ASSISTED BY HUMAN AGENTS

(71) Applicant: SAMSUNG SDS CO., LTD., Seoul (KR)

(72) Inventors: Jin Woon Kim, Seoul (KR); Chang Pil Kim, Seoul (KR); Ji Hun Kim, Seoul (KR); Joon Won Lee, Seoul (KR); Bong Won Nah, Seoul (KR); Byung Jae Park, Seoul (KR); Seul Gi Kang, Seoul (KR); Jin Soo Lee, Seoul (KR); Keum Sik Im, Seoul (KR); Joo Hee Ahn, Seoul (KR); Young Min Park, Seoul (KR); Jean Su Byun, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 16/044,732

(22) Filed: Jul. 25, 2018

(65) Prior Publication Data
US 2019/0034414 A1    Jan. 31, 2019

(30) Foreign Application Priority Data
Jul. 25, 2017    (KR) .......... 10-2017-0094260

(51) Int. Cl.
*G06F 40/279*    (2020.01)
*H04L 12/58*    (2006.01)
(Continued)

(52) U.S. Cl.
CPC ........ *G06F 40/279* (2020.01); *G06F 16/3329* (2019.01); *G06F 40/35* (2020.01);
(Continued)

(58) Field of Classification Search
CPC ............... G06F 17/2765; G06F 17/279; G06F 16/3329; G10L 15/22; G10L 2015/225; G10L 15/16; H04L 51/02
(Continued)

(56) References Cited

U.S. PATENT DOCUMENTS 5,566,272 A * 10/1996 Brems ..................... G10L 15/10
704/231
8,484,042 B2    7/2013 Cloran
(Continued)

OTHER PUBLICATIONS

Liu, B., "Sentiment Analysis and Subjectivity", 2010, Handbook of Natural Language Processing, Second Edition, pp. 1-38.
(Continued)

*Primary Examiner* — Bharatkumar S Shah
(74) *Attorney, Agent, or Firm* — Sughrue Mion, PLLC

(57) ABSTRACT

Provided is a method of providing an unmanned dialogue service according to an embodiment of the inventive concept. The method includes transmitting or receiving text message data constituting a dialogue to or from a user terminal, analyzing the dialogue and determining whether an abnormal situation has occurred, transmitting an assistance request including information regarding the dialogue to a human agent management apparatus when it is determined that the abnormal situation has occurred, receiving dialogue advancement guide information, which is a response to the assistance request, from the human agent management apparatus, wherein the dialogue advancement guide information is configured using input data of a human agent input to a human agent terminal connected to the human agent management apparatus and configured to receive a task for processing the assistance request allocated by the human agent management apparatus, and continuing the dialogue using the dialogue advancement guide information.

17 Claims, 10 Drawing Sheets

(51) Int. Cl.
*G10L 15/22* (2006.01)
*G06F 16/332* (2019.01)
*G06F 40/35* (2020.01)
*G10L 15/16* (2006.01)
*G06Q 10/00* (2012.01)

(52) U.S. Cl.
CPC .............. *G10L 15/22* (2013.01); *H04L 51/02* (2013.01); *G06Q 10/00* (2013.01); *G10L 15/16* (2013.01); *G10L 2015/225* (2013.01)

(58) Field of Classification Search
USPC .......................................................... 704/9
See application file for complete search history.

(56) References Cited

U.S. PATENT DOCUMENTS

| | | | |
|---|---|---|---|
| 2002/0143548 A1* | 10/2002 | Korall ................ | G06F 16/3329 704/270 |
| 2005/0080628 A1* | 4/2005 | Kuperstein ............ | G10L 15/22 704/270.1 |
| 2017/0134401 A1* | 5/2017 | Medvedovsky .... | H04L 63/1425 |
| 2018/0114527 A1* | 4/2018 | Zilotti ................... | H04M 3/527 |

OTHER PUBLICATIONS

Anonymous, "Sentiment analysis", 2018, Wikipedia, 7 pages total, https://en.wikipedia.org/wiki/Sentiment_analysis.

* cited by examiner

METHOD FOR PROVIDING DIALOGUE SERVICE WITH CHATBOT ASSISTED BY HUMAN AGENTS

This application claims priority from Korean Patent Application No. 10-2017-0094260 filed on Jul. 25, 2017 in the Korean Intellectual Property Office, the disclosure of which is incorporated herein by reference in its entirety.

BACKGROUND

1. Field of the Disclosure

The inventive concept relates to a method of providing an unmanned dialogue service assisted by a human agent, and more particularly, to a method of providing an unmanned dialogue service in which, when an unmanned dialogue service is provided between a user and a chatbot, a human agent assists incompleteness of the chatbot.

2. Description of the Related Art

A technique for communicating with software on a messenger has been provided. According to this technique, users can continue dialogue with the software on a messenger. The software is generally referred to as a chatbot or a chatting bot. A chatbot may be implemented to respond to a user's questions according to defined response rules. Artificial intelligence technology may be combined to enhance a chatbot's dialogue skills.

As time passes, a chatbot's dialogue skills will continue to evolve, but do not reach human dialogue skills yet. Therefore, it is required to provide a chatbot service, that is, an unmanned dialogue service capable of appropriately complementing the incompleteness of chatbots.

SUMMARY

Aspects of the inventive concept provide an unmanned dialogue service providing method and apparatus for advancing a dialogue between a user and a chatbot through a dialogue advancement guide input of a human agent when an abnormal situation is detected through analysis of the dialogue.

Aspects of the inventive concept also provide an unmanned dialogue service providing method and apparatus that switch into a service for chatting with a human counselor after preferential checking by a human agent when an abnormal situation is detected through analysis of a dialogue between a user and a chatbot.

It should be noted that objects of the inventive concept are not limited to the above-described objects, and other objects of the inventive concept will be apparent to those skilled in the art from the following descriptions.

According to an aspect of the inventive concept, there is provided A method of providing an unmanned dialogue service, which is performed by an unmanned dialogue service apparatus, the method comprising: transmitting or receiving text message data constituting a dialogue to or from a user terminal; analyzing the dialogue and determining whether an abnormal situation has occurred; transmitting an assistance request including information regarding the dialogue to a human agent management apparatus when it is determined that the abnormal situation has occurred; receiving dialogue advancement guide information, which is a response to the assistance request, from the human agent management apparatus, wherein the dialogue advancement guide information is configured using input data of a human agent that is input to a human agent terminal connected to the human agent management apparatus and configured to receive a task for processing the assistance request allocated by the human agent management apparatus; and continuing the dialogue by using the dialogue advancement guide information.

According to another aspect of the inventive concept, there is provided An unmanned dialogue service apparatus comprising: an utterance data input unit configured to transmit or receive text message data constituting a dialogue to or from a user terminal; and an abnormal-situation determination unit configured to analyze the dialogue and determine whether an abnormal situation has occurred, configured to transmit an assistance request including information regarding the dialogue to a human agent management apparatus when it is determined that the abnormal situation has occurred, configured to receive dialogue advancement guide information, which is a response to the assistance request, from the human agent management apparatus, and configured to continue the dialogue by using the dialogue advancement guide information,

BRIEF DESCRIPTION OF THE DRAWINGS

The above and other aspects and features of the inventive concept will become more apparent by describing in detail exemplary embodiments thereof with reference to the attached drawings, in which.

DETAILED DESCRIPTION OF THE EMBODIMENTS

Hereinafter, preferred embodiments of the present invention will be described with reference to the attached drawings. Advantages and features of the present invention and methods of accomplishing the same may be understood easily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent heir meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

Hereinafter, some embodiments of the inventive concept will be described with reference to the drawings.

The configurations and operations of unmanned dialogue service providing systems according to some embodiments of the inventive concept will be described with reference to FIGS. 1 and 2.

Figure 1:
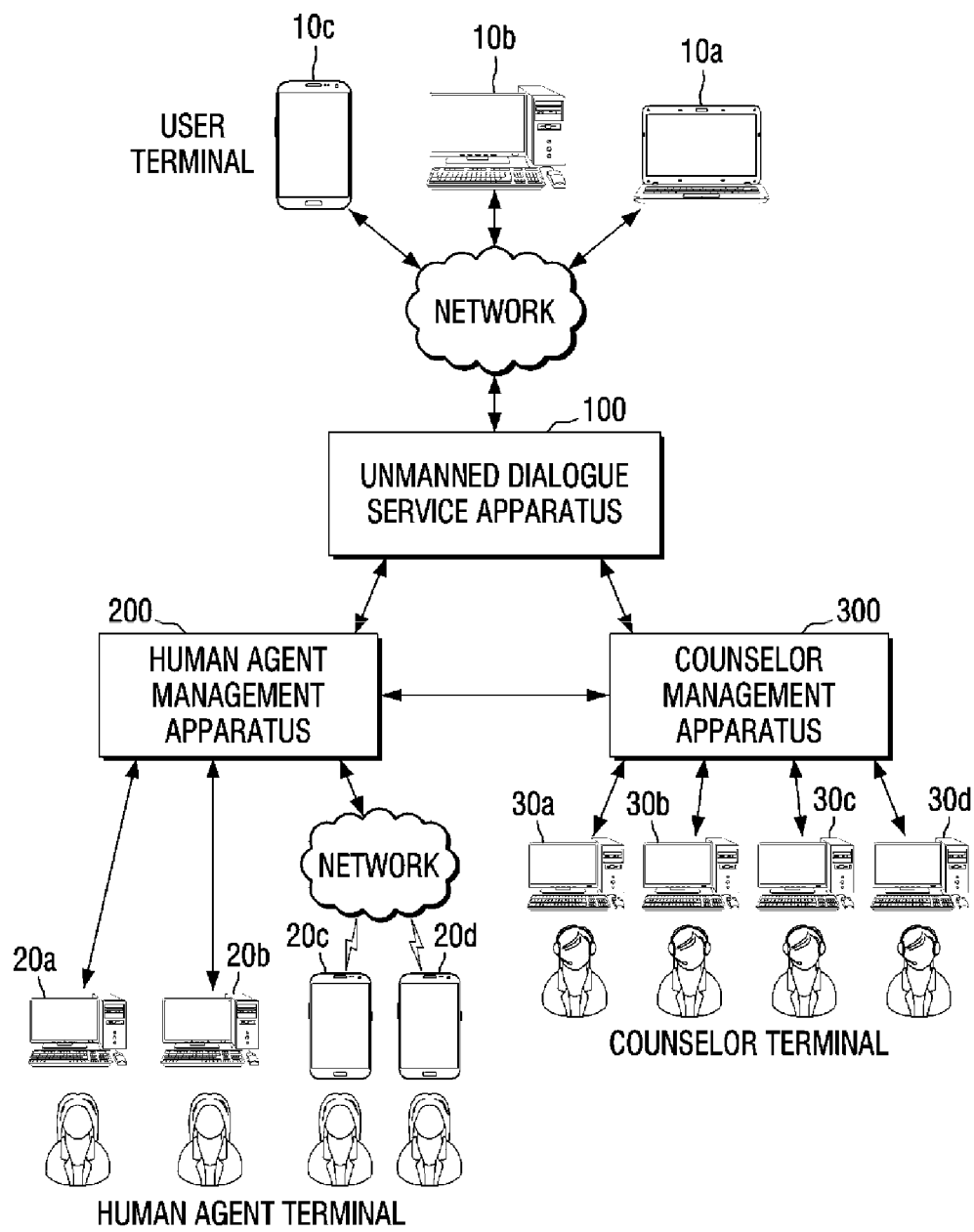
FIG. 1 is a first configuration diagram of an unmanned dialogue service system according to an embodiment.

FIG. 1 shows a configuration of a first embodiment of the unmanned dialogue service providing system. As shown in FIG. 1, the unmanned dialogue service providing system according to this embodiment includes an unmanned dialogue service apparatus 100 and a human agent management apparatus 200. Alternatively, the unmanned dialogue service providing system may further include a counselor management apparatus 300 as well as the unmanned dialogue service apparatus 100 and the human agent management apparatus 200.

The unmanned dialogue service apparatus 100 is connected to user terminals 10a, 10b, and 10c over a network such as the Internet. The unmanned dialogue service apparatus 100 provides, to the user terminals 10a, 10b, and 10c, a messenger dialogue service with a chatting bot. The unmanned dialogue service apparatus 100 manages a dialogue composed of a user message input through the user terminals 10a, 10b, and 10c and a chatting bot message created by the unmanned dialogue service apparatus 100 in response to the user message. In order to manage the dialogue, the unmanned dialogue service apparatus 100 may store one or more dialogue models.

The unmanned dialogue service apparatus 100 analyzes the dialogue to determine whether the dialogue is in an "abnormal situation." When it is determined that the dialogue is in the abnormal situation, the unmanned dialogue service apparatus 100 transmits, to the human agent management apparatus 200, an assistance request including information regarding the dialogue. History information of the dialogue may be included in the assistance request. In the history information, messages of the user and messages of the chatting bot may be arranged in chronological order. The term "abnormal situation" indicates a situation in which it is no longer possible or appropriate for the chatting bot to advance the dialogue. The term "abnormal situation" will be described in detail below with reference to some specific examples.

The human agent management apparatus 200 is connected to a plurality of human agent terminals 20a, 20b, 20c, and 20d over a network. The plurality of human agent terminals 20a, 20b, 20c, and 20d are terminal devices used by a human agent. The human agent management apparatus 200 allocates a processing task for the assistance request to one of the plurality of human agent terminals.

The ability required for the human agent may be an average language comprehension ability of adults. The human agent is distinguished from a counselor that is specially trained in association with a response to a user's request.

When the abnormal situation occurs, the human agent assists in advancing a dialogue between the user and the unmanned dialogue service apparatus 100. For example, when the user inputs a message expressing dissatisfaction with a dialogue with the unmanned dialogue service apparatus 100, the human agent inputs guide information for advancing the dialogue. Alternatively, when the unmanned dialogue service apparatus 100 cannot make an accurate decision to advance the dialogue, the human agent selects one of candidate answers suggested by the unmanned dialogue service apparatus 100. Alternatively, when the user inputs a message for calling a counselor in the dialogue with the unmanned dialogue service apparatus 100, the human agent determines whether to switch the situation to a counselor dialogue mode.

The human agent terminals may include a human agent terminal 20a or 20b connected to the human agent management apparatus 200 over a local network or a human agent terminal 20c or 20d connected to the human agent management apparatus 200 over an open network such as the Internet. That is, the human agent may be a person who is responsible for an unmanned dialogue service assistance task in a predetermined space such as a call center office or a person who is freely responsible for an unmanned dialogue service assistance task in an undesignated space.

When the processing task for the assistance request is allocated by the human agent management apparatus 200, the human agent terminals 20a, 20b, 20c, and 20d display information regarding the assistance request and also display a human agent user interface for receiving dialogue advancement guide information from the human agent. As described above, the history information of the dialogue may be included in the assistance request. That is, the human agent user interface may include a display region for displaying messages communicated between the user and the chatting bot and an input region for receiving guide information for advancing the dialogue between the user and the chatting bot.

Information that should be provided as the dialogue advancement guide information by the human agent may vary depending on the type of abnormal situation. Various embodiments in which the human agent management apparatus 200 determines that the dialogue is in the abnormal situation will be described below.

First Type of Abnormal Situation

When a negative expression is detected from a user message, the unmanned dialogue service apparatus 100 may determine that the dialogue is in the abnormal situation. At this time, the human agent may check the history information of the dialogue through the human agent user interface displayed on the human agent terminal and input a counselor switching command according to severity of the expression (see FIG. 7B or 7C), a command for continuing the unmanned dialogue (See FIG. 7A), or a command for enabling one of several predefined example response phrases to be used as an answer message.

In an embodiment, the negative expression indicates a predetermined banned word. The banned word may include at least one of profanities, obscene phrases, and one or more custom banned words designated by an unmanned dialogue service provider.

In another embodiment, the negative expression is an expression indicating a negative sentiment. Whether the expression indicates a negative sentiment may be determined utilizing sentiment analysis, which is a well-known technology. That is, if a result obtained by performing sentiment analysis on a newly input user message does not reach a reference (i.e., the result is analyzed as a negative sentiment with respect to the reference), the dialogue may be determined as being in the abnormal situation. Refer to the following documents for the sentiment analysis.

Web document "https://en.wikipedia.org/wiki/Sentiment analysis"

Liu, Bing (2010). "Sentiment Analysis and Subjectivity". In Indurkhya, N.; Damerau, F. J. Handbook of Natural Language Processing (Second ed.)

Second Type of Abnormal Situation

When a counselor calling expression is detected from a newly input user message, the unmanned dialogue service apparatus 100 may determine that the dialogue is in the abnormal situation. In this case, the unmanned dialogue service apparatus 100 may include a predetermined number of messages previous to the expression for calling the counselor in the dialogue history information included in the assistance request so that the human agent can figure out a reason for calling the counselor by the user. The human agent may check the dialogue history information through a human agent user interface displayed on the human agent terminal, and input a counselor switching command or input a command for continuing the unmanned dialogue.

Third Type of Abnormal Situation

Meanwhile, the unmanned dialogue service apparatus 100 may service a plurality of chatting bots that support different dialogue domains. For example, the unmanned dialogue service apparatus 100 may operate a daily dialogue chatting bot, a counseling chatting bot for a specific service, a query response chatting bot, and so on. The daily dialogue chatting bot may support a dialogue in a daily dialogue domain and may advance a dialogue according to a daily dialogue model. The daily dialogue model may support functions such as rule-based answer creation, an example-based answer creation, etc. The counseling chatting bot for the specific service may support a dialogue in a domain associated with the specific service and may support a dialogue according to a scenario-based model based on state transition. The query response chatting bot may create a response message for a query through a predetermined database or search engine. The query response chatting bot processes as a target a natural language message of which intent is a question.

When a user message belonging to a dialogue domain that is not supported by a chatting bot currently in service is input, the unmanned dialogue service apparatus 100 may determine that the dialogue is in the abnormal situation. For example, when a user inputs an inquiry message regarding credit card business while an unmanned dialogue with a first counseling chatting bot is performed on a car insurance renewal service, the first counseling chatting bot may not be able to appropriately respond to the inquiry message. This is because the first counseling chatting bot performs a natural language understanding process on a user message through a first term dictionary composed of entities related to the car insurance renewal service and the inquiry message for the credit card business is likely to include an entity that is not included in the first term dictionary. The entity refers to symbols, words, or expressions which are used frequently in a dialogue domain or provide specific information. For example, when the car insurance renewal service is a dialogue domain, "special contract for mileage," "couple-limited special contract," "personal indemnification," "payment in substitutes," and the like may be considered as the entity included in the term dictionary.

When a user message belonging to the dialogue domain that is not supported by the chatting bot currently in service is input, the chatting bot is required to be replaced by a new chatting bot. In this case, the unmanned dialogue service apparatus 100 may receive the new chatting bot designated through the human agent terminals 20a, 20b, 20c, and 20d. As described above, the unmanned dialogue service apparatus 100 transmits an assistance request including a dialogue history to the human agent management apparatus 200 so that a human agent may refer to the dialogue history. The unmanned dialogue service apparatus 100 may further include a candidate chatting bot list in the assistance request. In this case, the human agent may check the dialogue history and may select one appropriate chatting bot among candidate chatting bots presented on a screen.

In an embodiment, the list for the candidate chatting bots may be a list of all chatting bots that are serviced by the unmanned dialogue service apparatus 100. In another embodiment, the candidate chatting bot list may include only chatting bots in which symbols, words, or expressions included in a new user message are registered as entities in the term dictionary.

Fourth Type of Abnormal Situation

When it is difficult to identify the user intention of a newly input user message although tokenizing, natural language processing, and natural language understanding are performed on the newly input user message and a result thereof is applied to a dialogue model applied to the current dialogue, the unmanned dialogue service apparatus 100 may determine that the dialogue is in the abnormal situation. In this case, the assistance request includes a plurality of candidate intentions of the recent message according to the dialogue model of the dialogue.

This will be described in detail with reference to FIG. 6. When a user inputs a natural language message "My cell phone went flat, and where should I go?", the unmanned dialogue service apparatus 100 performs a process such as tokenizing, natural language processing, and natural language understanding on the message. Subsequently, the unmanned dialogue service apparatus 100 identifies the user intention contained the message on the basis of the dialogue model of the dialogue being currently advanced.

Figure 6:
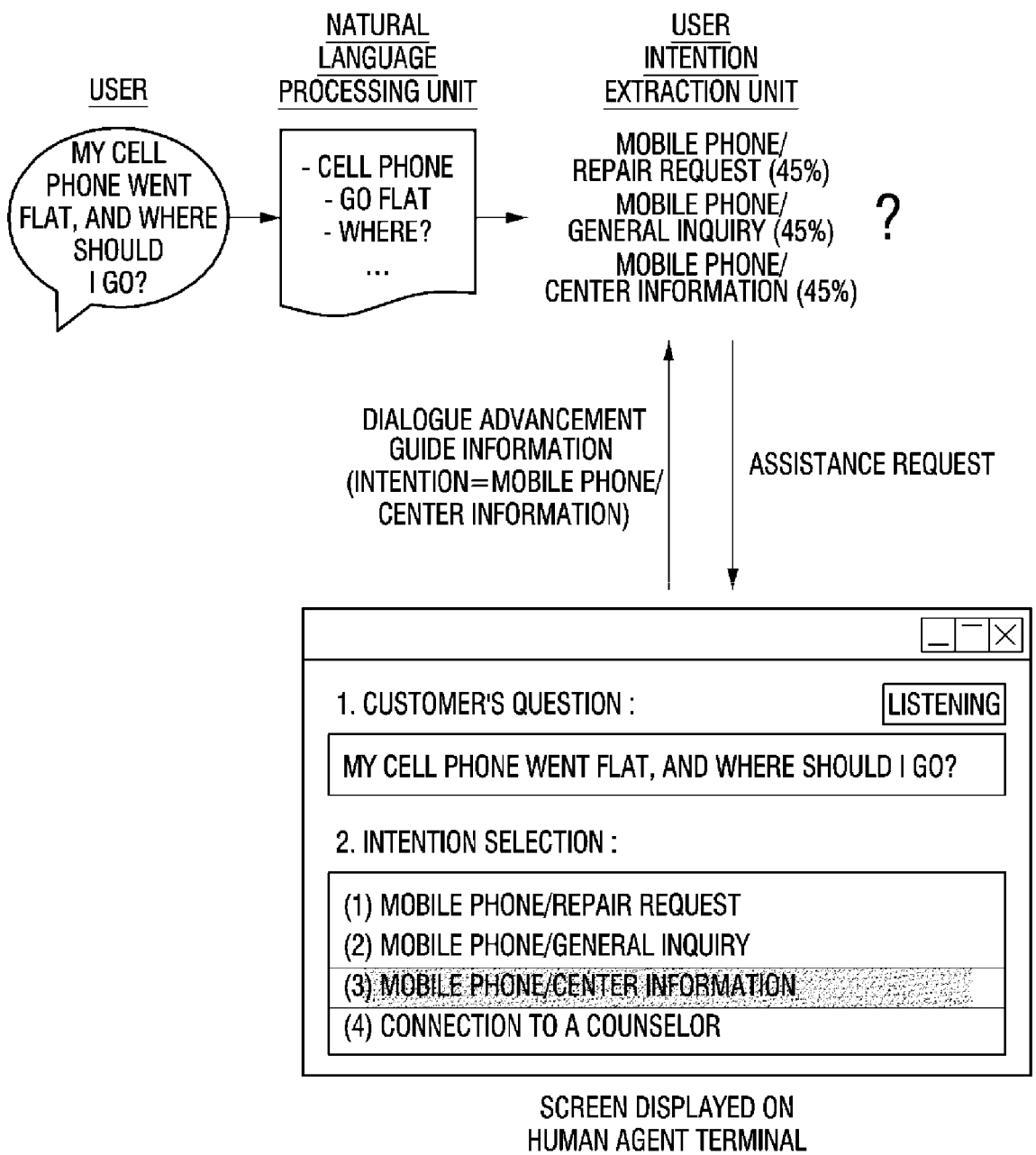
FIGS. 6 to 7C are conceptual views illustrating an operation performed when a dialogue is determined as being abnormal, according to some embodiments.

However, as shown in FIG. 6, a plurality of candidate intentions rather than only one intention may be extracted from the user message. Three candidate intentions such as "mobile phone/repair request," "mobile phone/general inquiry," and "mobile phone/center information" are extracted from the message shown in FIG. 6. It will be appreciated that, as shown in FIG. 6, the unmanned dialogue service apparatus 100 may autonomously select a candidate intention with the highest reliability by using a reliability score assigned to each candidate intention. However, since a reliability score associated with extraction of the user intention may not be accurate, the unmanned dialogue service apparatus 100 may transmit an assistance request including a dialogue history (particularly, a new user message) and a plurality of extracted user intentions to the human agent management apparatus 200.

The human agent management apparatus 200 transmits at least some data included in the assistance request to the human agent terminals. As a result, the human agent terminals 20a, 20b, 20c, and 20d may display a human agent user interface as shown in FIG. 6.

The human agent selects a user's intention contained in the message through the human agent user interface, and information indicating the selected user's intention is provided to the unmanned dialogue service apparatus 100 as dialogue advancing guide information. As a result, the unmanned dialogue service apparatus 100 may continue the dialogue by applying the user's intention designated by the human agent to a dialogue model being currently advanced.

Various situations have been reviewed in which the unmanned dialogue service apparatus 100 analyzes the dialogue to determine whether an abnormal situation has occurred while transmitting or receiving text message data constituting the dialogue to or from a user terminal. Meanwhile, the human agent may input, through the human agent user interface displayed on the human agent terminals 20*a*, 20*b*, 20*c*, and 20*d*, a command for enabling a user of the user terminal 10*a*, 10*b*, or 10*c* to advance a chatting with an actual counselor other than a chatting bot. When the user no longer seems to be able to chat with the chatting bot, the human agent may input a command for chatting with a counselor. In this case, the human agent management apparatus 200 transmits information such as a dialogue history and session information associated with the dialogue to the counselor management apparatus 300. In this case, the unmanned dialogue service apparatus 100 no longer performs a process of analyzing a user message and creating a response message for the user message. Instead, the unmanned dialogue service apparatus 100 delivers the user message to the counselor management apparatus 300 and operates in a by-pass mode in which a message delivered through the counselor management apparatus 300 and input to a counselor terminal 30*a*, 30*b*, 30*c*, or 30*d* is delivered to the user terminal 10*a*, 10*b*, or 10*c*.

Figure 2:
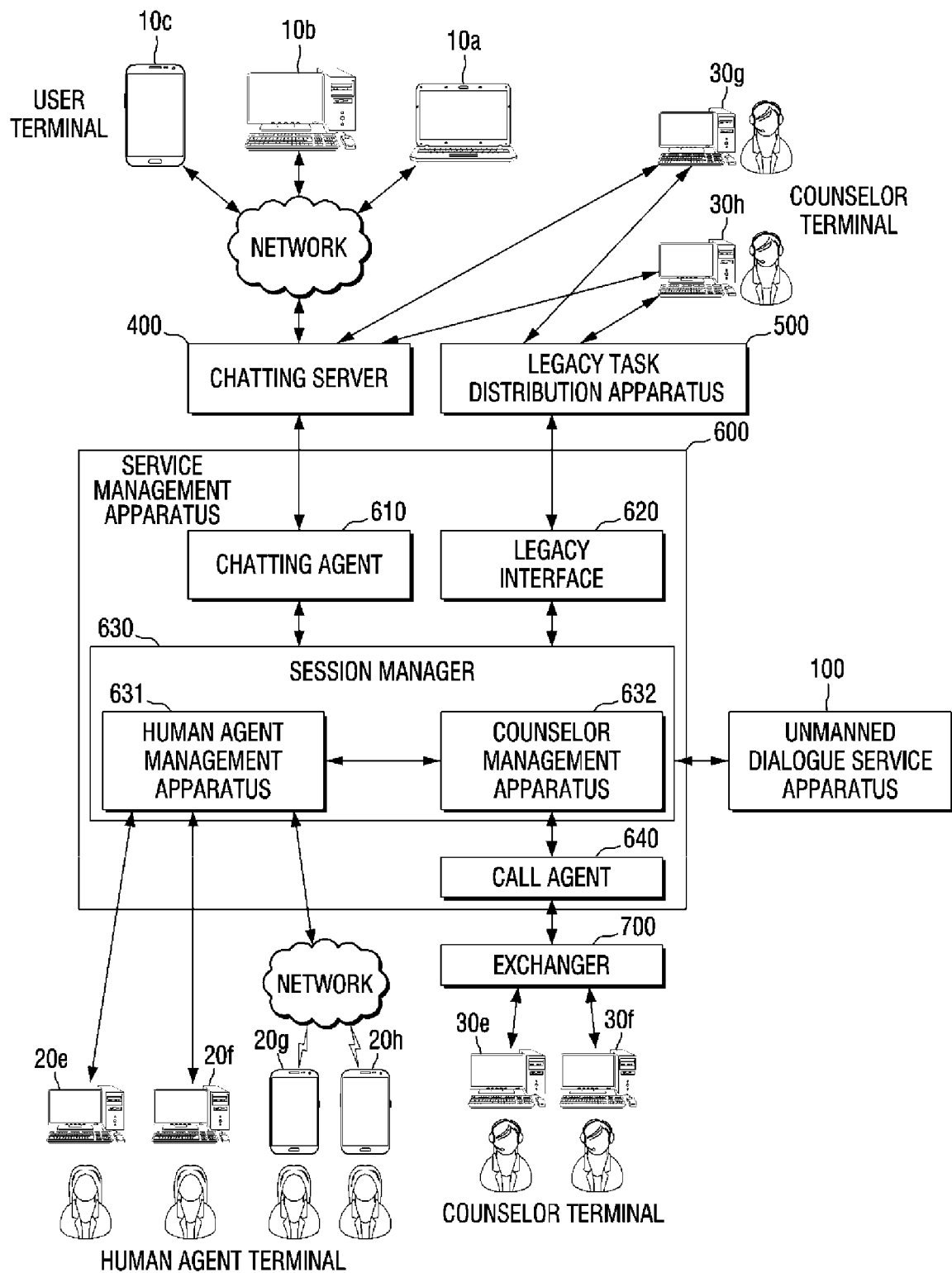
FIG. 2 is a second configuration diagram of an unmanned dialogue service system according to an embodiment.

FIG. 2 shows a configuration of a second embodiment of the unmanned dialogue service providing system. As shown in FIG. 2, the unmanned dialogue service providing system according to this embodiment includes a service management apparatus 600 and an unmanned dialogue service apparatus 100.

The unmanned dialogue service apparatus 100 of the unmanned dialogue service providing system shown in FIG. 2 operates similarly to that of the unmanned dialogue service apparatus of FIG. 1 in that the apparatus analyzes a dialogue between a chatting bot and a user terminal 10*a*, 10*b*, or 10*c* and creates an assistance request when it is determined that an abnormal situation has occurred.

The human agent management apparatus 200 of FIG. 1 is implemented as a human agent management module 631 inside a session manager 630 of the service management apparatus 600, and the counselor management apparatus 300 of FIG. 1 is implemented as a counselor management module 632 inside the session manager 630 of the service management apparatus 600. That is, the human agent management apparatus of the present disclosure may be configured in the form of an independent apparatus 200 as shown in FIG. 1 and may be configured in the form of a software module 631 inside the session manager 630 as shown in FIG. 2. Also, the counselor management apparatus of the present disclosure may be configured in the form of an independent apparatus 300 as shown in FIG. 1 and may be configured in the form of a software module 632 inside the session manager 630 as shown in FIG. 2.

A chatting message input by a user to the user terminal 10*a*, 10*b*, or 10*c* is transmitted to a chatting server 400 over a network. The chatting server 400 delivers the chatting message to a chatting agent 610 of the service management apparatus 600. The chatting agent 610 is a software interface module serving as an adaptor between the session manager 630 and an external apparatus.

When a session for the chatting message delivered by the chatting agent 610 is not established, the session manager 630 establishes a new session for a dialogue to be started from the chatting message and delivers the chatting message to the unmanned dialogue service apparatus 100 along with information regarding the new session. The unmanned dialogue service apparatus 100 creates a response message for the chatting message and matches the information regarding the new session to the dialogue including the chatting message. The unmanned dialogue service apparatus 100 provides the response message to the session manager 630 along with the information regarding the new session. Subsequently, the response message is transmitted to the user terminal 10*a*, 10*b*, or 10*c* via the chatting agent 610 and the chatting server 400.

As the chatting message included in the dialogue is accumulated, the unmanned dialogue service apparatus 100 allocates a chatting bot matched to a dialogue domain of the dialogue as a dialogue member and determines a dialogue model suitable for a dialogue pattern, thereby providing an unmanned dialogue service. The session manager 630 also provides the information regarding the new session to the chatting server 400. Thus, the chatting server 400 manages session information of the service management apparatus 600 matched to the dialogue.

When the chatting message is not an initial message for starting the dialogue, the chatting server 400 provides the session information of the service management apparatus 600 matched to the dialogue to the chatting agent 610 of the service management apparatus 600 together with the chatting message.

The service management apparatus 600 has a hybrid architecture that enables a conventional legacy call center system and the unmanned dialogue service apparatus 100 to interoperate to provide a service. A legacy interface 620, a call agent 640, and the chatting agent 610, which operate on dedicated hardware, are provided to implement the hybrid architecture.

When an abnormal situation occurs in an unmanned dialogue mode in which a dialogue is made with a chatting bot, the unmanned dialogue service apparatus 100 provides an assistance request to the human agent management module 631 of the session manager 630, receives dialogue advancement guide information, which is a response to the assistance request, from the human agent management module 631 in response to the assistance request, and then advances a dialogue between the user and the chatting bot. A detailed description of an example of the "abnormal situation" refers to an embodiment described with reference to FIG. 1.

Figure 7A:
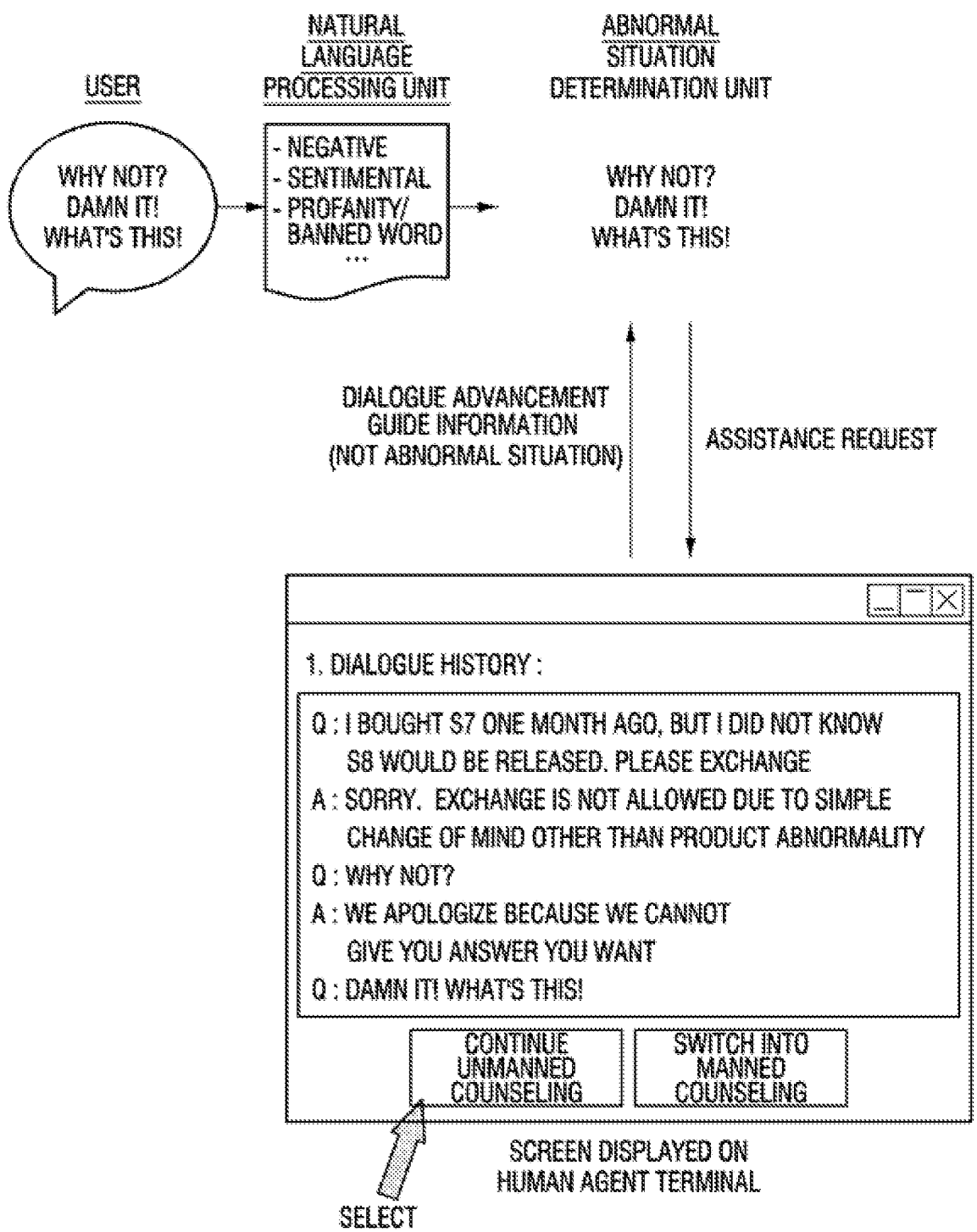
Figure 7B:
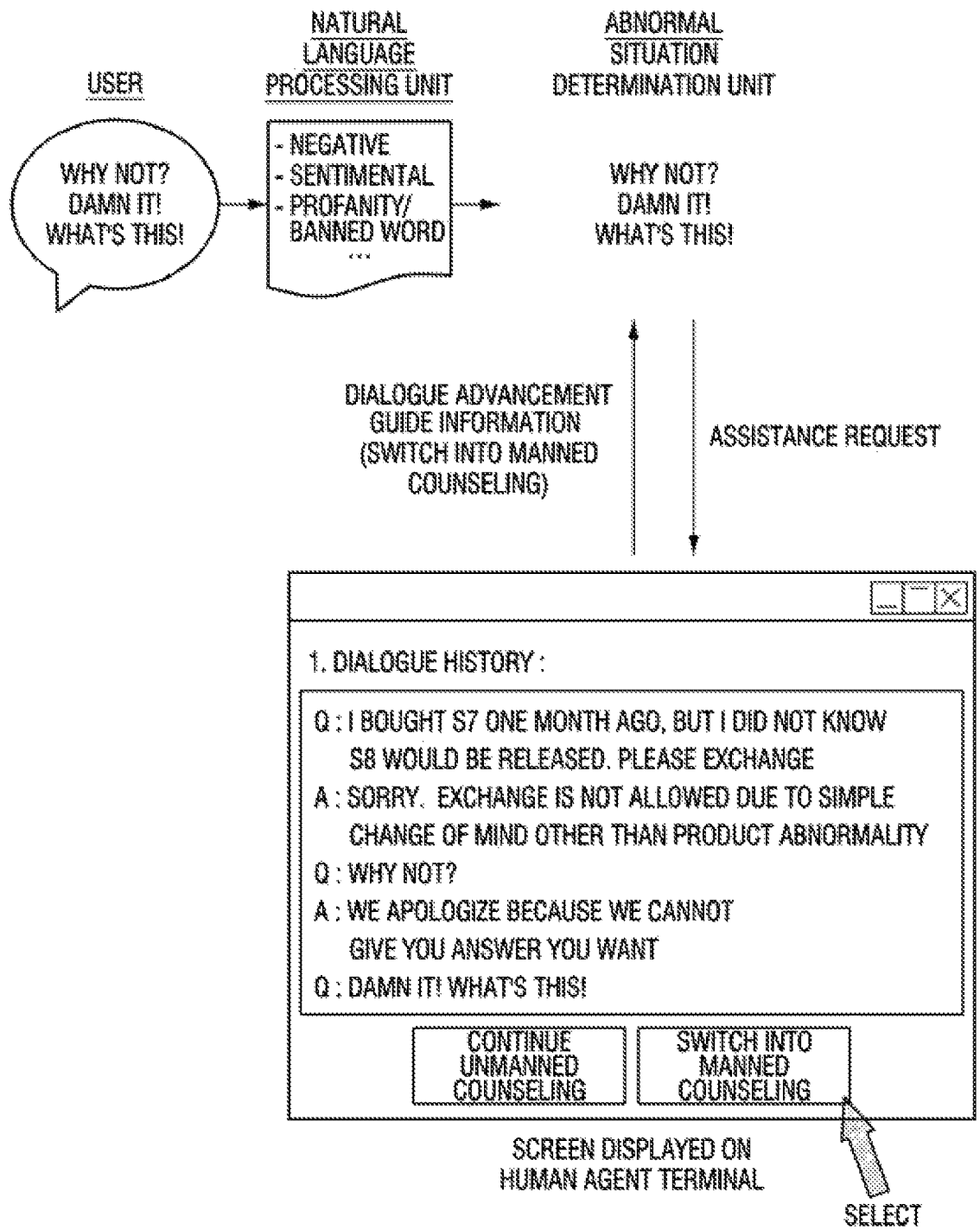

A human agent may input, through a human agent interface displayed on a human agent terminal 20*e*, 20*f*, 20*g*, or 20*h*, a command for advancing a chatting with a counselor (see FIG. 7B). In this case, when an input signal of the command for advancing the chatting with the counselor is received from the human agent terminal 20*e*, 20*f*, 20*g*, or 20*h*, the human agent management module 631 provides session information for the dialogue to the counselor management module 632. The counselor management module 632 delivers the session information for the dialogue to a legacy task distribution apparatus 500 through the legacy interface 620. The legacy task distribution apparatus 500 allocates a task corresponding to the dialogue to one of counselor terminals 30*g* and 30*h* connected to the legacy task distribution apparatus 500. The task includes the session information for the dialogue.

The counselor terminal 30*g* or 30*h* transmits a chatting connection request including the session information to the chatting server 400. Like the service management apparatus 600, the chatting server 400 manages the session information in the service management apparatus 600 on a dialogue basis. Thus, the chatting server 400 may change a partner of the dialogue, that is, replace the chatting bot by the counselor terminal 30g or 30h in response to reception of the chatting connection request.

Figure 7C:
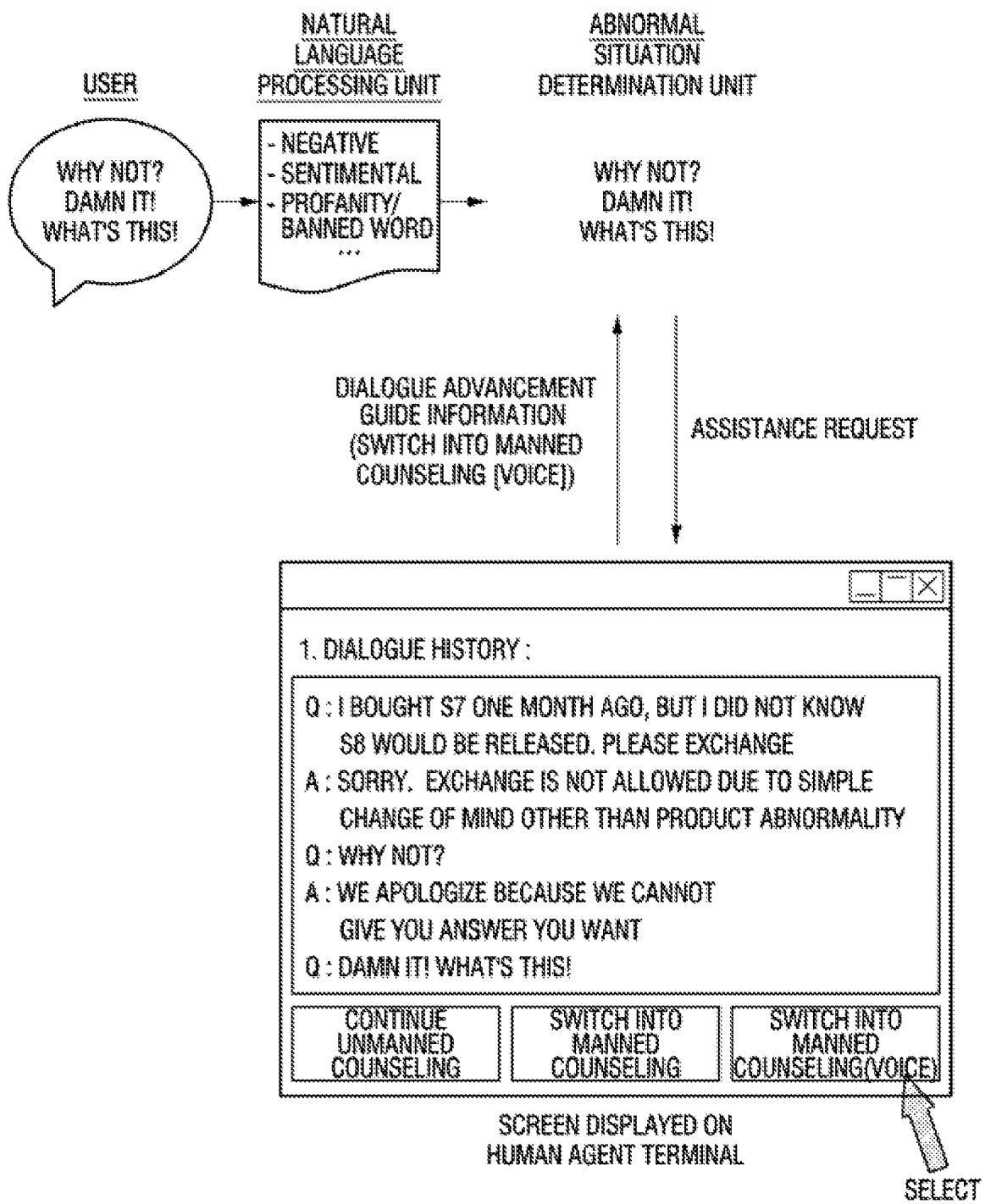

The human agent may input, through the human agent interface displayed on the human agent terminal 20e, 20f, 20g, or 20h, a command for advancing a phone consultation with a counselor (see FIG. 7C). In this case, when an input signal of the command for advancing the phone consultation with the counselor is received from the human agent terminal 20e, 20f, 20g, or 20h, the human agent management module 631 provides session information for the dialogue to the counselor management module 632. The counselor management module 632 delivers information regarding phone connection to the user terminal 10a, 10b, or 10c to an exchanger 700 through the call agent 640. The exchanger 700 establishes a phone call with the user terminal 10a, 10b, or 10c using the phone connection information, and allocates a phone consultation task to one of counselor terminals 30e and 30f connected to the exchanger 700 when the establishment of the phone call is successful. In an embodiment, the exchanger 700 receives history information of the dialogue from the counselor management module 632 through the call agent 640 and provides the history information to the counselor terminal 30e or 30f.

Figure 3:
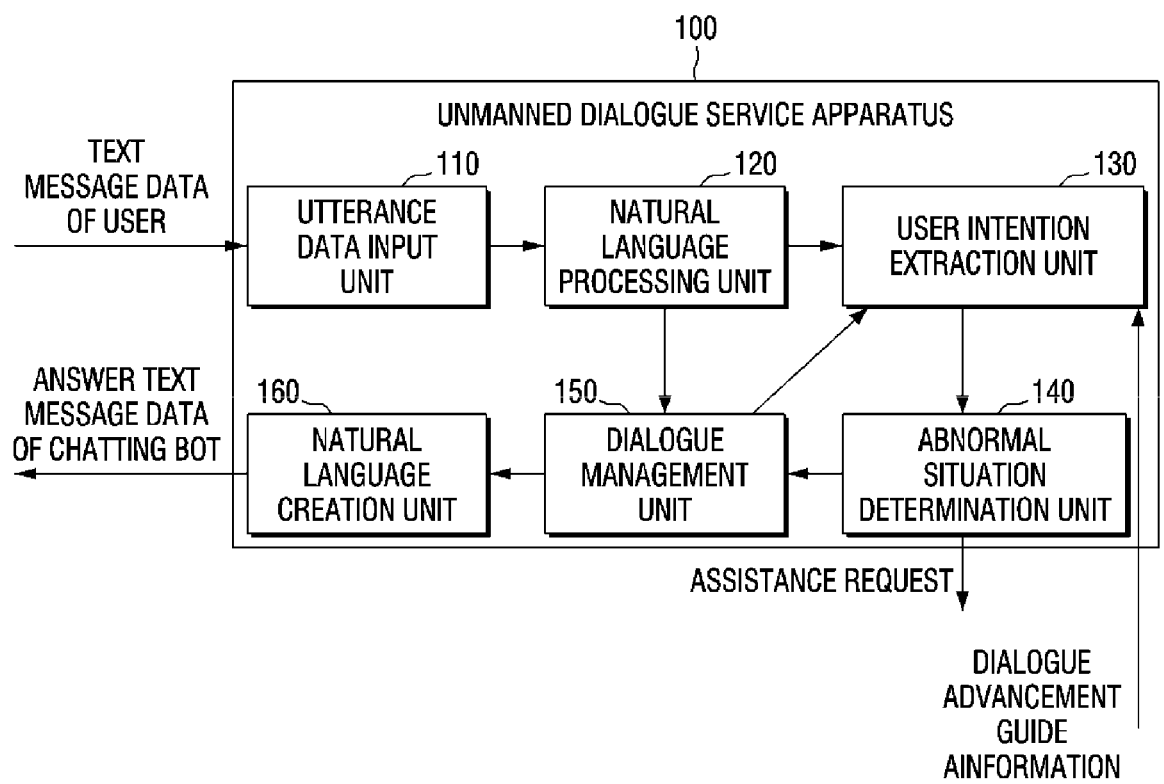
FIG. 3 is a first block diagram of an unmanned dialogue service apparatus according to an embodiment.

The configuration and operation of the unmanned dialogue service apparatus according to an embodiment of the inventive concept will be described below with reference to FIG. 3. The unmanned dialogue service apparatus 100 according to this embodiment includes an utterance data input unit 110 configured to receive text message data of a user created by a user terminal, a natural language processing unit 120 configured to receive a text message from the utterance data input unit 110 and perform tokenizing, natural language processing, natural language understanding, and the like, a dialogue management unit 150 configured to receive a processing result of the natural language processing unit 120 and manage advancement of a dialogue including the text message according to a dialogue model of the dialogue, and a natural language creation unit 160 configured to create an answer to the text message in the form of a natural language under control of the dialogue management unit 150.

The unmanned dialogue service apparatus 100 according to this embodiment further includes a user intention extraction unit 130 and an abnormal-situation determination unit 140.

The user intention extraction unit 130 receives a processing result of the natural language processing unit 120 and dialogue model information of the dialogue management unit 150 and extracts the user's utterance intentions according to the text message of the user.

The abnormal-situation determination unit 140 analyzes the dialogue and determines whether an abnormal situation has occurred. The abnormal-situation determination unit 140 may receive the processing result of the natural language processing unit 120 and the dialogue model information of the dialogue management unit 150 as well as a result of the user intention extraction unit 130 extracting the user's intention so as to determine whether an abnormal situation has occurred. A part described with reference to FIG. 1 may be referred to for the operation of the abnormal-situation determination unit 140 according to various types of abnormal situations.

When it is determined that the abnormal situation has occurred, the abnormal-situation determination unit 140 may transmit an assistance request for advancing the dialogue to an external apparatus. The external apparatus may be, for example, a human agent management apparatus.

When it is determined that the abnormal situation has occurred because the user intention extraction unit 130 does not clearly identify the user's intention with respect to a new message as a single intention, the user intention extraction unit 130 may receive dialogue advancement guide information including the user's intention with respect to the new message designated by the human agent and provide, to the dialogue management unit 150, an accurate user intention with respect to the new message.

As described with reference to FIG. 1, when the unmanned dialogue service is designated to be advanced because there are various types of abnormal situations and the human agent is not in the abnormal situation in a specific type of abnormal situation, in addition to when the user's intention cannot be clearly identified as a single intention, the dialogue advancement guide information may be provided to the dialogue management unit 150 unlike those shown in FIG. 3, and the dialogue management unit 150 may continue the dialogue according to the dialogue model.

Figure 4:
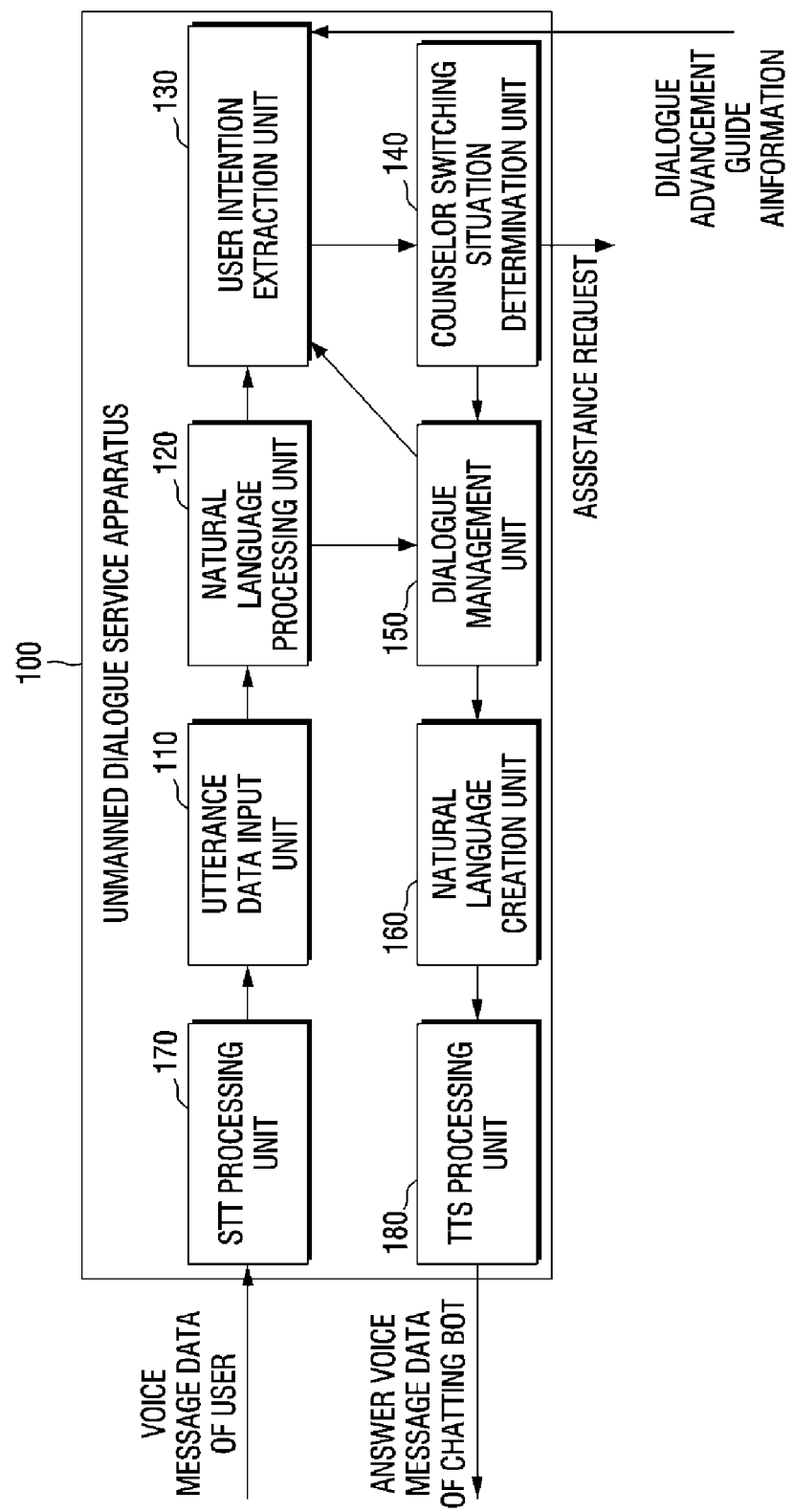
FIG. 4 is a second block diagram of an unmanned dialogue service apparatus according to an embodiment.

The configuration and operation of the unmanned dialogue service apparatus according to an embodiment of the inventive concept will be described below with reference to FIG. 4. The unmanned dialogue service apparatus 100 according to this embodiment has the same function as that of the unmanned dialogue service apparatus 100 described with reference to FIG. 3, except that a voice message input function and a voice message output function are additionally included. That is, voice message data of a user transmitted from a user terminal is provided to a speech-to-text (STT) processing unit 170, is converted into text message data, and then provided to the utterance data input unit 110, and a response text message created by the natural language creation unit 160 is provided to a text-to-speech unit (TTS) 180 and is converted into a voice message.

The unmanned dialogue service apparatus 100 according to this embodiment can provide a service having a dialogue with a chatting bot by voice and continue the dialogue with assistance of a human agent when it is determined that the abnormal situation has occurred during the dialogue. The unmanned dialogue service apparatus 100, which is a speaker connected to the Internet, may be connected to the user terminal, which has a microphone.

Figure 5:
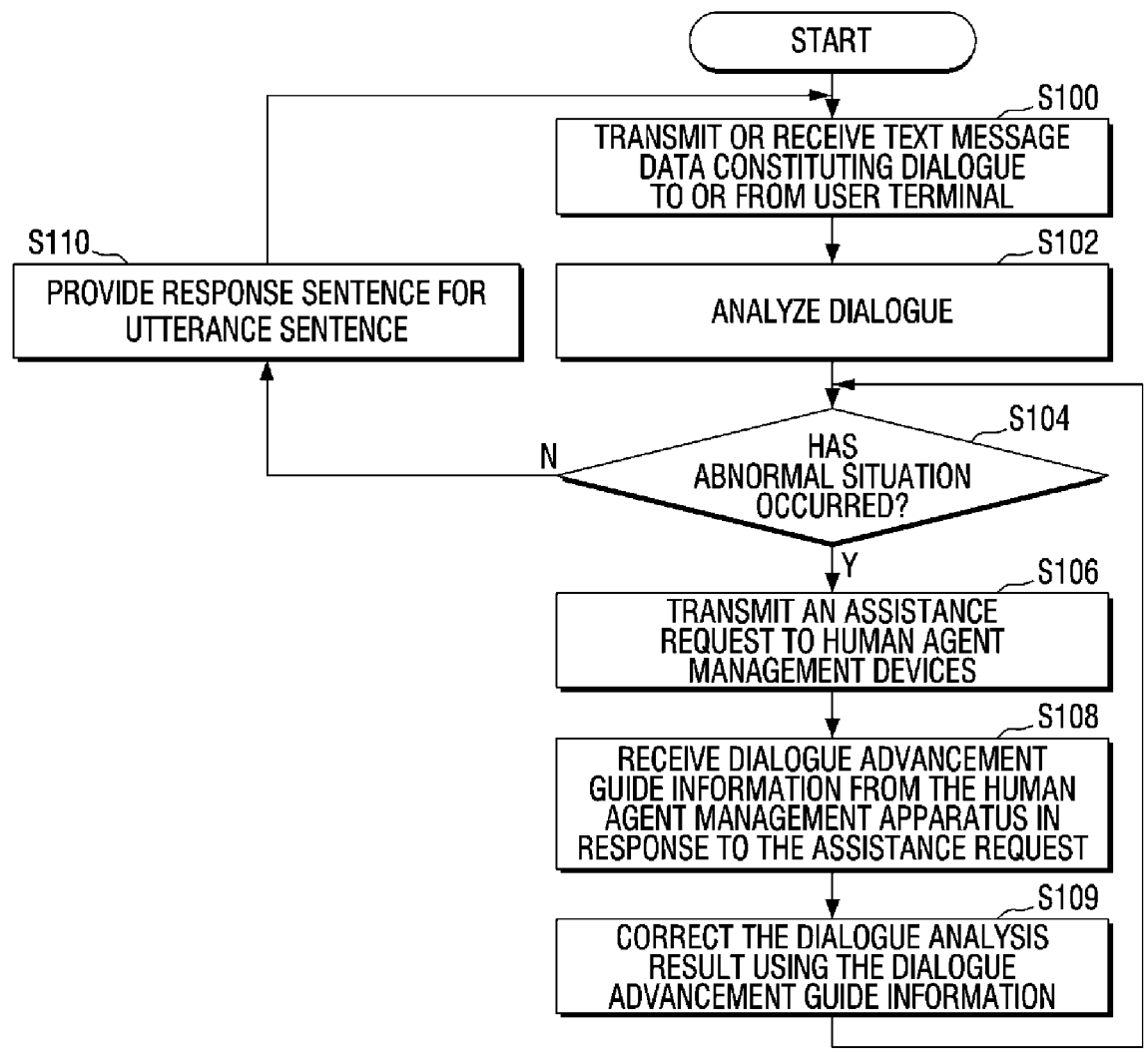
FIG. 5 is a first flowchart of an unmanned dialogue service providing method according to an embodiment.

An unmanned dialogue service providing method according to an embodiment of the inventive concept will be described below with reference to FIG. 5. The unmanned dialogue service providing method according to this embodiment may be performed by a computing apparatus.

To facilitate understanding, each operation of the unmanned dialogue service providing method according to this embodiment will be described assuming that the computing apparatus is the unmanned dialogue service apparatus 100 described with reference to FIGS. 1 to 4.

First, by transmitting or receiving text message data constituting a dialogue to or from a user terminal, an unmanned dialogue is made between a user and a chatting bot (S100). Then, the unmanned dialogue is analyzed (S102). When a result of the analysis is that an abnormal situation has not occurred (S104), a response sentence for an utterance sentence is provided (S110). When a result of the analysis is that an abnormal situation has occurred (S104), an assistance request is transmitted to a human agent management apparatus (S106). Dialogue advancement guide information is received from the human agent management apparatus in response to the assistance request (S108).

Subsequently, the dialogue analysis result is corrected using the dialogue advancement guide information (S109).

The correction of the dialogue analysis result using the dialogue advancement guide information may refer to different behaviors depending on the type of abnormal situation. For example, when the type of abnormal situation is a type in which a user's intention is not clear, the correction of the analysis result may refer to correcting a user intention of a new message to a user intention determined by a human agent. Also, when the type of abnormal situation is a type in which a negative expression is discovered, the correction of the analysis result may refer to changing a situation flag to nonoccurrence of an abnormal situation when a result determined by the human agent is to continue the unmanned dialogue service (when a value indicating continuity of the unmanned dialogue service is included in the dialogue advancement guide information).

By correcting the analysis result (S109), it may be determined that no abnormal situation has occurred when whether an abnormal situation has occurred is determined again. Accordingly, by providing the response sentence for the utterance sentence (S110), the dialogue continues.

In some embodiments of the inventive concept, when a result of analyzing the dialogue is that an abnormal situation has occurred, some operations of the human agent management apparatus and the human agent terminal are performed in order to receive assistance from the human agent, as described above. In this case, the user does not perform any operation to receive assistance from the human agent. Accordingly, the user will not even know that the assistance is received from the human agent.

In some embodiments of the inventive concept, the operation performed when it is determined that the dialogue is in an abnormal situation will be described below with reference to FIGS. 6 to 7C.

As already mentioned several times, one of the types in which an abnormal situation has occurred indicates a case in which the user's intention for a new message is not well understood. Such a situation is indicated by the situation shown in FIG. 6. The human agent determines one of four candidates as an intention for a customer's question and provides the intention to the unmanned dialogue service apparatus. Thus, the chatting bot helps to continue a dialogue with a concerned party.

In an embodiment, by performing machine learning using presentation of a user's intention for a recent message of the human agent, it is possible to enhance an ability to identify the user's intention for a message. The machine learning include adding a matching of the recent message and the actual intention to training data and updating a model for identifying the intention of the message received from the user terminal by using the training data when the training data exceeds a reference value. In this case, the machine learning is supervised learning in that a speaker's intention contained in each message is tagged.

In an embodiment, the model for identifying the speaker's intention may be configured in the form of an artificial neural network. In this case, when the user's intention for a message determined by the unmanned dialogue service apparatus is different from that presented by the human agent, the user's intention may be determined as an error, and a model for identifying the intention of the message may be updated through error back-propagation.

Figure 8:
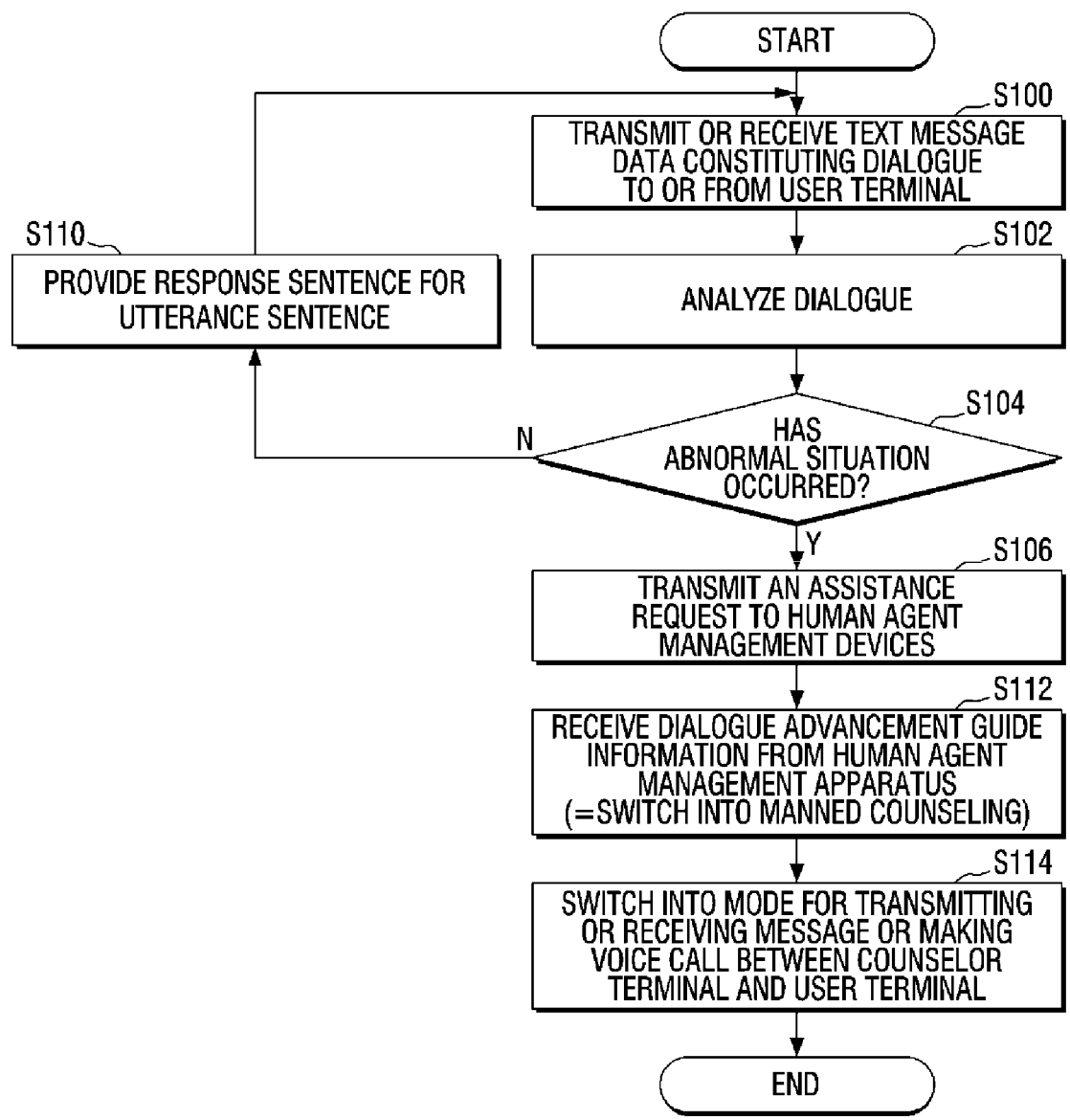
FIG. 8 is a second flowchart of an unmanned dialogue service providing method according to an embodiment.

Another type in which an abnormal situation has occurred is a case in which a negative expression is detected from a dialogue. For a minor issue, the human agent may make a selection to continue an unmanned counseling as shown in FIG. 7A. For an issue in which it is not easy to maintain a dialogue, the human agent may make a selection to switch into a manned counseling (chatting) as shown in FIG. 7B. For an issue in which it is not possible to maintain a dialogue through chatting, the human agent may make a selection to switch into a manned counseling (phone) as shown in FIG. 7C. That is, the unmanned dialogue service providing method according to this embodiment may include switching into a manned counseling after preferential determination by the human agent. This will be described with reference to FIG. 8.

First, by transmitting or receiving text message data constituting a dialogue to or from a user terminal, an unmanned dialogue is made between a user and a chatting bot (S100). Then, the unmanned dialogue is analyzed (S102). When a result of the analysis is that an abnormal situation has not occurred (S104), a response sentence for an utterance sentence is provided (S110). When a result of the analysis is that an abnormal situation has occurred (S104), an assistance request is transmitted to a human agent management apparatus (S106).

When dialogue advancement guide information including data indicating to switch into a manned counseling is received from the human agent management apparatus (S112), dialogue history information or dialogue session information are delivered to a counselor terminal so that message transmission/reception or voice call is made between the counselor terminal and the user terminal, and as a result, the unmanned dialogue service is switched into a dialogue service through a chatting or call with a counselor (S114). With respect to detailed operations related thereto, reference is made to the description of the embodiment with reference to FIG. 2. In an embodiment, in order to prevent the user from noticing that the switching is made into the manned counseling, the unmanned dialogue service providing apparatus may automatically convert a speech style of a counselor input message input to the counselor terminal into a speech style of a character employed by the unmanned dialogue service and transmit the message to the user terminal.

Conversion from unmanned counseling by a chatting bot to manned counseling by a counselor leads to deterioration in terms of cost and processing capacity and thus should be avoided as much as possible. Therefore, only when a specific requirement is satisfied, the human agent may issue a manned-counseling switching command.

For example, only for a dialogue of which an abnormal situation has been overcome through assistance of the human agent one or more times, a button for issuing the manned-counseling switching command may be provided to the human agent user interface.

Also, for example, a button for issuing the manned-counseling switching command may be provided to the human agent user interface only when a specific type of abnormal situation has occurred. The specific type of abnormal situation may be any one of a type in which a negative expression is detected and a type in which a counselor is called.

The above-described methods according to embodiments of the inventive concept may be performed by executing a computer program embodied in computer-readable code. The computer program may be transmitted from a first computing device to a second computing device via a network, such as the Internet, and may be installed in, and used by, the second computing device. The first computing device and the second computing device include a server apparatus, a physical server belonging to a server pool for a cloud service, and a stationary computing device such as a desktop personal computer (PC).

The computer program may be stored in a recording medium such as a digital versatile disc-read only memory (DVD-ROM), a flash memory device, or the like.

While the present invention has been particularly illustrated and described with reference to exemplary embodiments thereof, it will be understood by those of ordinary, skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method comprising:
   providing, by an unmanned dialogue service apparatus, an unmanned dialogue service that includes transmitting to and receiving from a user terminal, by the unmanned dialogue service apparatus, text message data constituting a dialogue;
   analyzing, by the unmanned dialogue service apparatus, the dialogue and identifying whether an abnormal situation has occurred;
   based on identifying that the abnormal situation has occurred, transmitting, by the unmanned dialogue service apparatus, an assistance request including information regarding the dialogue to a human agent management apparatus;
   receiving, by the unmanned dialogue service apparatus, dialogue advancement guide information from the human agent management apparatus; and
   continuing, by the unmanned dialogue service apparatus, the unmanned dialogue service by using the received dialogue advancement guide information to advance the dialogue,
   wherein the dialogue advancement guide information is generated based on a human agent designating, on a human agent terminal, one of a plurality of candidate options, in response to the transmitted assistance request,
   wherein the plurality of candidate options includes a response to the transmitted assistance request based on the information regarding the dialogue included in the transmitted assistance request,
   wherein the human agent terminal receives a task for processing the transmitted assistance request from the human agent management apparatus,
   wherein the dialogue advancement guide information comprises information for designating the one of the plurality of candidate options, and
   wherein the continuing the unmanned dialogue service comprises applying the designated one of the plurality of candidate options to create a response message for a message received.

2. The method of claim 1, wherein the identifying whether the abnormal situation has occurred comprises:
   detecting a negative expression from text constituting the dialogue that is received from the user terminal; and
   identifying whether the abnormal situation has occurred by using at least one from among a number of detections of the negative expression and a frequency of detections of the negative expression.

3. The method of claim 1, wherein the identifying whether the abnormal situation has occurred comprises identifying that the abnormal situation has occurred based on an expression for calling a counselor being detected from text constituting the dialogue that is received from the user terminal.

4. The method of claim 1, wherein the identifying whether the abnormal situation has occurred comprises identifying that the abnormal situation has occurred based on an inability to identify an intention of the message received from the user terminal according to a dialogue model of the dialogue, and
   wherein the assistance request comprises a plurality of candidate intentions of the message received according to the dialogue model of the dialogue.

5. The method of claim 4, wherein the receiving the dialogue advancement guide information comprises:
   adding a matching of the message received and an actual intention to supervised-learning-based training data; and
   updating a model for identifying the intention of the message received from the user terminal by using the supervised-learning-based training data.

6. The method of claim 1, wherein the identifying whether the abnormal situation has occurred comprises identifying that the abnormal situation has occurred based on the message received from the user terminal belonging to a dialogue domain that is not supported by a chatting bot currently in service.

7. The method of claim 1, wherein the continuing the unmanned dialogue service comprises:
   switching into a mode for transmitting or receiving a message between a counselor terminal and the user terminal according to input of a counselor switching command of the human agent through the human agent terminal based on it being identified that the abnormal situation has occurred.

8. The method of claim 7, wherein the switching into the mode for transmitting or receiving the message between the counselor terminal and the user terminal comprises automatically converting a speech style of a counselor input message input to the counselor terminal into a speech style of a character employed by the unmanned dialogue service, and transmitting the message to the user terminal.

9. The method of claim 7, wherein the human agent terminal provides a user interface for enabling the counselor switching command to be selectively input depending on the abnormal situation.

10. The method of claim 1, wherein the continuing the unmanned dialogue service comprises:
    switching into a mode for making a voice call between a counselor terminal and the user terminal according to input of a voice call switching command of the human agent through the human agent terminal based on identifying that the abnormal situation has occurred.

11. An unmanned dialogue service apparatus comprising:
    a network communication interface configured to provide an unmanned dialogue service that includes transmitting to and receiving from a user terminal text message data constituting a dialogue; and
    a processor configured to:
        analyze the dialogue and identify whether an abnormal situation has occurred;
        transmit an assistance request including information regarding the dialogue to a human agent management apparatus based on identifying that the abnormal situation has occurred, configured to receive dialogue advancement guide information from the human agent management apparatus; and
        continue the unmanned dialogue service by using the received dialogue advancement guide information to advance the dialogue, wherein the dialogue advancement guide information is generated based on a human agent designating, on a human agent terminal, one of a plurality of candidate options, in response to the transmitted assistance request, wherein the plurality of candidate options includes a response to the transmitted assistance request based on the information regarding the dialogue included in the transmitted assistance request, wherein the human agent terminal receives a task for processing the transmitted assistance request from the human agent management apparatus, wherein the dialogue advancement guide information comprises information for designating the one of the plurality of candidate options, and wherein the continuing the unmanned dialogue service comprises applying the designated one of the plurality of candidate options to create a response message for a message received.

12. The unmanned dialogue service apparatus of claim 11, wherein the processor is further configured to:

detect a negative expression from text constituting the dialogue that is received from the user terminal; and identify whether the abnormal situation has occurred by using at least one from among a number of detections of the negative expression and a frequency of detections of the negative expression.

13. The unmanned dialogue service apparatus of claim 11, wherein the processor is further configured to identify that the abnormal situation has occurred based on an expression for calling a counselor being detected from text constituting the dialogue that is received from the user terminal.

14. The unmanned dialogue service apparatus of claim 11, wherein the processor is further configured to, based on the message received from the user terminal belonging to a dialogue domain that is not supported by a chatting bot currently in service, identify that the abnormal situation has occurred.

15. The unmanned dialogue service apparatus of claim 11, wherein the processor is further configured to:

switch into a mode for transmitting or receiving a message between a counselor terminal and the user terminal according to input of a counselor switching command of the human agent through the human agent terminal based on identifying that the abnormal situation has occurred.

16. The unmanned dialogue service apparatus of claim 15, wherein the human agent terminal provides a user interface for enabling the counselor switching command to be selectively input depending on the abnormal situation.

17. The unmanned dialogue service apparatus of claim 11, wherein the processor is further configured to:

switch into a mode for making a voice call between a counselor terminal and the user terminal according to input of a voice call switching command of the human agent through the human agent terminal based on identifying that the abnormal situation has occurred.

* * * * *